United States Patent [19]

Kemper

[11] 3,860,798

[45] Jan. 14, 1975

[54] CIRCUIT ARRANGEMENT FOR THE MEASURING OF THE MAXIMAL VALUE OF THE DISTORTION OF A BINARY SERIES OF STEPS DURING AN ADJUSTABLE MEASURING PERIOD

[75] Inventor: Jürgen Kemper, Zurich, Switzerland

[73] Assignee: Siemens Aktiengesellschaft, Postfach, Germany

[22] Filed: May 15, 1973

[21] Appl. No.: 360,536

Related U.S. Application Data

[63] Continuation of Ser. No. 138,696, April 29, 1971, abandoned.

[30] Foreign Application Priority Data

May 8, 1970 Germany............................ 2022554

[52] U.S. Cl.......... 235/92 PB, 235/92 R, 235/92 PS, 324/83 D

[51] Int. Cl. ............................................ H03k 21/32

[58] Field of Search........ 235/92 TF, 92 FQ, 92 PB, 235/92 PS; 340/347 SY; 324/83 D, 86; 328/134, 162

[56] References Cited

UNITED STATES PATENTS 2,966,300 12/1960 Dickinson..................... 340/347 SY

FOREIGN PATENTS OR APPLICATIONS 1,158,097 7/1969 Great Britain.................... 324/83 D

*Primary Examiner*—Gareth D. Shaw
*Assistant Examiner*—Joseph M. Thesz, Jr.
*Attorney, Agent, or Firm*—Schuyler, Birch, Swindler, McKie & Beckett

[57] ABSTRACT

A circuit arrangement is described for measuring distortion values for binary signals. The arrangement measures a maximum value occurring in a preselected measuring period. A timing signal generator is arranged for producing, during an ideal duration of a step, a number of timing impulses corresponding to the distortion stages to be measured. A synchronizing device is arranged for classifying the incoming binary signal series of steps in a time frame. Timing impulses control the first counter which produces impulses having time differences corresponding to the aforementioned ideal signal length. The timing impulses control second and third counters, as well. The aforementioned three counters count in a phase locked relation to each other, and each counter counts once during the duration of an ideal step. Each counter has as many counting positions as there are distortion values to be measured. The second counter is returned to its starting position and the appearance of a measuring impulse, and this indicates leading distortion. For the duration of the phase difference between one of the counters and one of the remaining two counters, a gate is opened for switching through timing impulses to a measuring device. The number of timing impulses measured corresponds to the distortion value.

4 Claims, 5 Drawing Figures

CIRCUIT ARRANGEMENT FOR THE MEASURING OF THE MAXIMAL VALUE OF THE DISTORTION OF A BINARY SERIES OF STEPS DURING AN ADJUSTABLE MEASURING PERIOD

This is a continuation of application Ser. No. 138,696, filed Apr. 29, 1971 now abandoned.

BACKGROUND OF THE INVENTION

The invention relates to a circuit arrangement for the measuring of the maximal value of the distortion of a binary series of steps during an adjustable measuring period, optionally as leading individual distortion, lagging individual distortion or isochronous total distortion.

The measurement of distortion with digital indication can indicate in contrast to other indicating processes, for example, an oscillagraphic indication, not all distortion values, but rather only the maximal values measured in an adjustable measuring period. The distortion value in isochronous distortion corresponds to the sum of the leading and lagging individual distortion, and thus, to a step reversal at an ideal time point which is formed in the measuring apparatus as the average value of all the step reversals contained therein.

There is already known a circuit arrangement of a distortion measure with static memories. FIG. 1 shows a block circuit diagram for a known distortion measuring device. Timing impulses T1 from a generally count-controlled timing generator arrive at the input of the synchronizing device SE. The series of steps to be measured is arranged in the input circuit ES in the timing frame. At the output of the synchronizing device, the timing impulses arrive at the counter chain Z, which contains as many counter stages, as there are distortion values to be indicated. If, for example, the base timing signal T1 is divided by 100, then there arises at the output of the counter chain Z an impulse for each step. The distortion measurement then results in steps of 1 percent. With the step reversals, the correct phase position of the step timing signal T2 is determined by the synchronizing device and a possibly present difference in the number of revolutions is balanced. A step reversal in the input stage ES calls back the counter reading from the counter chain Z. The counter reading is given off separately according to leading and lagging distortion either in the control stage ST1 or in the control stage ST2. Each control stage contains a comparator. The counter reading is compared with the value stored in the following memory SP1 or SP2. The counter value is taken over in one of the two memories only when the present distortion value is greater than the value written in the memory. The differentiation between leading distortion and lagging distortion is determined thereby, through the position with respect to the step timing signal T2. The two distortion values written in the memories are added in the adder stage AS, and at the end of the measuring period, the stored distortion value is given out over the switch S and the intermediate storeage ZSP. After a code transformation, the isochronous distortion is represented in an indicating apparatus AZ. In position 1 of the switch S, the leading distortion is indicated, in position 2 the lagging distortion and in position 3, the isochronous total distortion. With the formulation of the memories as bistable trigger stages, there results a considerable expenditure for the control stages, and the comparators contained therein. With the addition of the two distortion values, two eight place binary numbers must be added. The above described circuit arrangement is limited in the magnitude of the achievable speed of operation by the transition time within the counter chain, so that with utilization of integrated switching circuit the maximum possible speed of operation can not be utilized.

It is the object of the invention to provide a circuit arrangement which works according to a measuring principle which requires a small expenditure and allows a higher speed of operation, so that the maximum speed of operation of an integrated switching circuit technology can be utilized.

SUMMARY OF THE INVENTION

This problem is solved in that a timing signal generator is arranged which gives off during the ideal duration of a step or pulse a number of timing impulses corresponding to the distortion stages or distortion values to be shown; that a synchronizing device is arranged which arranges the binary series of steps received by the input circuit in the timing screen; that the timing impulses control a first counter chain which gives off impulses at the output with a time difference corresponding to the ideal step length; that the timing impulses control a second and a third counter chain; that the three counter chains count in a phase locked relation to each other; that each counter chain counts once through during the duration of an ideal step and possesses as many counting positions as there are distortion values to be shown; that the second counter chain is returned to the beginning position at the appearance of a measuring impulse which exhibits a leading distortion; that the third counter chain is returned to the beginning position at the appearance of a measuring impulse which exhibits a lagging distortion; that for the duration of the phase displacement between one of the two counter chains and the first counter chain a gate is released, which switches the timing impulses through to a counter device; and that the number of the timing impulses corresponds to the distortion value.

The circuit arrangement in accordance with the invention works according to the dynamic memory principle which makes possible an especially advantageous construction. The circuit arrangement can be constructed especially advantageously in integrated switching circuit technology, whereby stages of construction, known in the art, find application. The circuit arrangement works, unobjectionably, up to the maximal speed of operation of the utilized integrated circuit technology.

BRIEF DESCRIPTION OF THE DRAWINGS

Details of the invention will be explained with reference to advantageous working examples and time diagrams, which are represented in the FIGS. 2 through 5.

Figure 1:
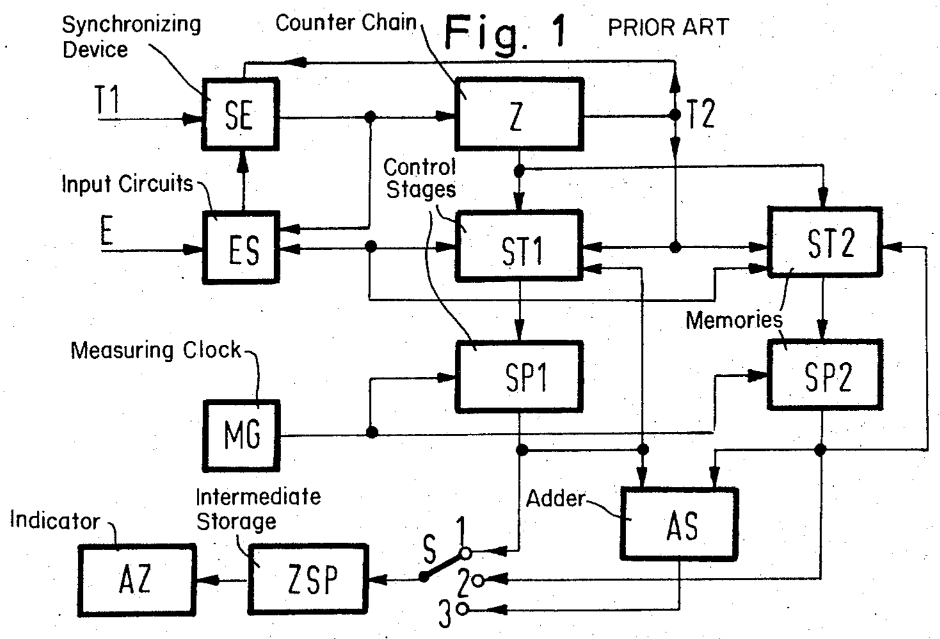
Fig. 1 PRIOR ART
Figure 2:
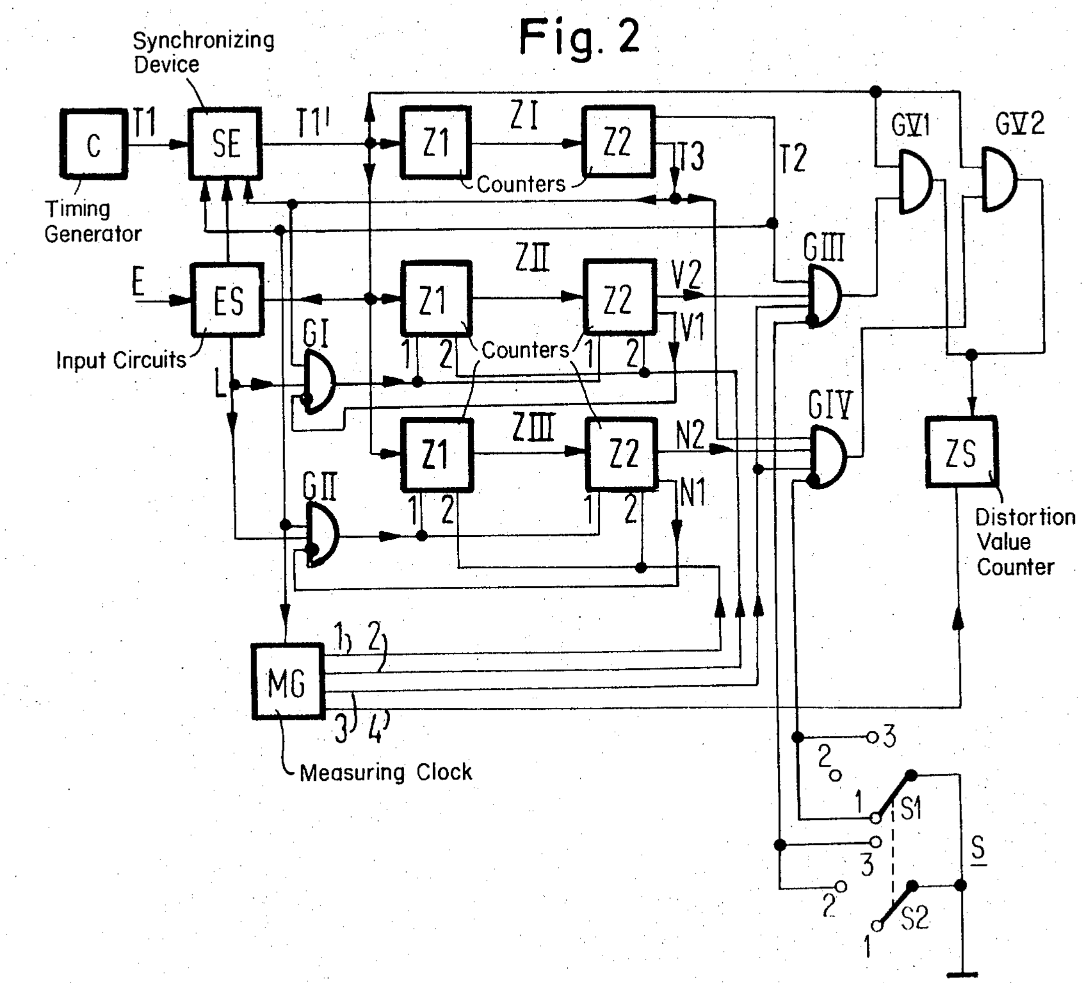
FIG. 2 shows the block circuit diagram of a preferred embodiment of a distortion measurement device with dynamic measured value storage.

DETAILED DESCRIPTION OF THE DRAWINGS:

In FIG. 2, the time signal T1 coming from a generally count-controlled timing generator, lies at the synchronizing device SE. The synchronizing device is constructed to shift in phase the timing signals, so that they coincide with edges of input signals appearing at terminal E. This operation is discussed in greater detail hereinbelow in connection with FIGS. 3 and 4. Any of the wide variety of prior art pulse phase shifting devices can be used to accomplish this purpose. For example, the pulse phase shifting apparatus described in FIGS. 3 and 6 of U.S. Pat. No. 3,240,877 can be used. The series of steps to be measured is routed over the input E to the input circuits ES, taken over in the time signal frame and transformed into measuring impulses adapted to the system, which impulses are given out at the output L of the input circuit. As indicated by the discussion hereinbelow with respect to FIGS. 3 and 4, input circuit ES produces the impulses L from the edges of the input pulses at terminal E, and accordingly, a bi-stable flip flop circuit is indicated for performing this function. Any of the wide variety of certain circuits known in the art can be used, and an example of a suitable circuit is the input circuit St1 in FIG. 1 of U.S. Pat. No. 3,045,063. The polarity changes of the input series of steps bring about over the synchronizing device, the correct phase position of the time signal which balances individually present differences in the time position between input signals at E and time signal pulses T1. At the output of the synchronizing device SE, there arises the correct time signal T1'. The corrected time signal T1' controls the counter chain Z1, which consists of the two decimal counters Z1 and Z2 connected in series. With a counter volume of 100, there arises a distortion indication in values of 1 percent. That is, in this exemplary embodiment the individual time intervals produce distortion indications of one percent per interval, because they are one percent of the ideal pulse duration. The counter chain Z1 reaches the beginning position after an ideal step duration. At the output of the counter chain Z1, the impulses T2 arise at a distance of the ideal step duration. Because binary trigger stages are utilized as counter stages, there arises at the other output of the last counter stage the inverted step time signal T3. Two further counter chains ZII and ZIII, which correspond in construction to the counter chain ZI, are controlled by the correct time signal T1'. The two counter chains ZII and ZIII are utilized for the dynamic storage of measured values. The counter chain ZII stores the leading distortion values, while the counter chain ZIII stores the lagging distortion values. The counter chains ZII and ZIII consists, like the counter chain ZI, of two successively connected decimal counters - ZI and Z2. Each of the two counters of the counter chains ZII and ZIII contain return inputs 1 and 2, over which a reset operation by the gates GI and GII is possible. The measuring impulses at the output L of the input circuit ES lie at an input of the gates GI and GII. From the time position of the measuring impulse relative to the step time signal T2, there results the leading or lagging distortion. The impulses T3 lie at gate GI, while the gate G1 is controlled by the impulses T2. At the beginning of the measurement, the counter chains ZI, ZII and ZIII count synchronized and phase lock to each other so that, in any given case, each counter chain exhibits the same counter reading. At the appearance of a measuring impulse at the output L which exhibits a leading distortion, the counter chain ZII is returned over the gate GI to the start position. Thereby, a phase difference arises between the counter chain ZI and ZII. For the duration of the phase difference, the gate GV is open by an output of the gate G111. The gate GV switches the timing impulses T1' through to the counter stage ZS for the duration of the release. The counter stage ZS counts the impulses, the number of which corresponds to the distortion value. If the counting yields four impulses, then the measuring impulse has a distortion of 4 percent relative to the ideal time point. The counter chain ZII and the output V1, which lies on an input of the gate GI. Thereby, it is guaranteed, that only a measuring impulse which exhibits a leading distortion greater than the value stored in the counter chain ZII, causes a reset of the counter chain and thereby a new storage (a new recording in the memory). The other output V2 gives the impulse series inverted with respect to V1 to the gate GIII. At the appearance of a measuring impulse, having a lagging distortion, at the output L, the third counter chain ZIII is reset over the gate GII to the starting position. The output N1 of the counter chain lies at the input of the gate GII, while the negated output N2 lies at the input of the gate GIV. The phase difference in the counter values between the counter chains ZI and ZIII effects that the gate GIV is released for the duration of the phase difference, and that the timing impulses T1' reach the counter stage ZS over the gate GV. The counter stage now indicates the lagging distortion. It is possible with the switch S to indicate the maximal values of the lagging distortion (position 2) the leading distortion (position 1) or the maximal isochronous total distortion (position 3). The measuring clock MG determines the time duration of the measurement of the distortion and further controls the counter chains ZII and ZIII into the rest position at the correct point in time which occurs at the agreement with the reading of the counter chain ZI. Measuring clock MG is merely a simple clock or timing generator of any of the many types of well known in the art, any any of these conventional types may be used. For example, a simple flip flop circuit or an oscillator may be used.

Figure 3:
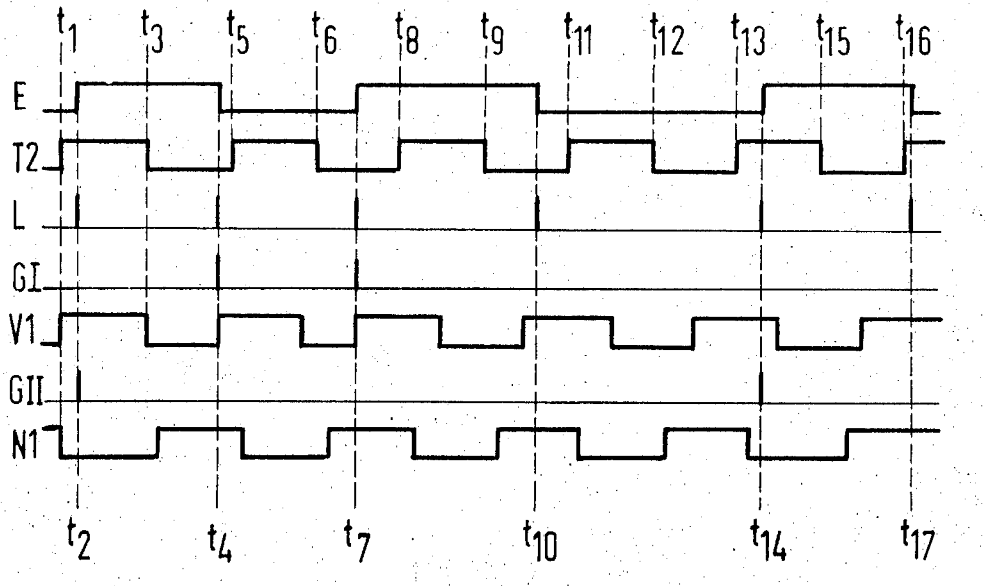
FIG. 3 shows a time diagram for the formation of the distortion values in the dynamic measured value memories.

The time diagram in FIG. 3 shows the take over of the measured values in the dynamic measured value memory, which consists of counter chains ZII and ZIII. The line E shows the series of steps lieing at the input of the input circuit ES, the distortion values of which are to be measured. The line T2 shows the step timing signal at the output of the counter chain ZI. The line L shows the measuring impulses at the output of the input circuit ES. The output impulses at the gate GI, which control the counter chain ZII into the rest position, are designated with GI. Count V1 represents the output impulses of the counter chain ZII, while the output impulses of the gate GII are designated with GII. The last line in FIG. 3 shows the impulses at the output N1 of the counter chain ZIII. The points in time $t_1$ through $t_{17}$ determine the take over of a measuring value in the dynamic measured value memory.

At the point in time, $t_1$ the counter chains ZI and ZII are in phase, while the counter chain ZIII is in opposite phase. This corresponds to a distortion value "zero". At the point in time $t_2$, the series of steps E to be measured changes its polarity, based on the step time signal with lagging distortion. The measuring impulse resulting from the change of polarity opens the gate GII, because this gate was prepared from time point $t_1$ on by the step time signal T2. The negated input of the gate GII is controlled by the output N1 of the counter chain ZIII and was also prepared from time point $t_1$ on by the low potential from N1. The measuring impulse now returns the counter chain ZIII to the beginning position, so that the counter chain ZIII counts with a phase difference in comparison with the counter chain ZI. The extent (size) of this phase difference corresponds to the stored distortion value. The leading back of the output N1 of the counter chain ZIII to the negated input of the gate GII represents the control for the input of the maximal value. In the same manner, the control of the input of the maximal value by the counter chain ZIII through the leading back of the output V1 to the negated input of the gate GI. In the next time region of the lagging distortion from $t_5$ to $t_6$, the gate GII will first be released through the output N1 from ZIII after the previously stored measured value is exceeded because of the phase difference of ZIII. The measuring impulse arriving at time point $t_{17}$ is therefore not taken over. At time point $t_4$ and $t_7$ the counter chain ZII for the leading distortion is returned by measuring impulses and the distortion values are taken over. The measuring impulses arriving at time points $t_{10}$ and $t_{17}$ cannot be taken over because their value is smaller than the stored value, and thus, the blocking of the gate GI through the output V1 cannot be lifted.

Figure 4:
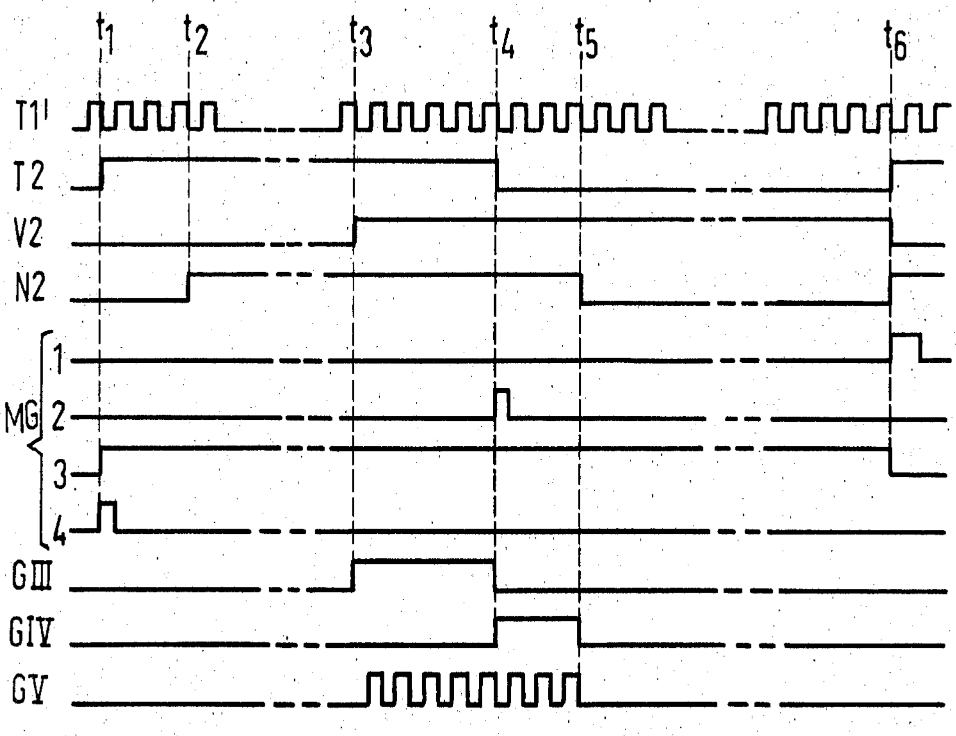
FIG. 4 is a time diagram illustrating the production of the stored measured values with reference to a time diagram.

FIG. 4 shows the giving out of the distortion values from the dynamic memories ZII and ZIII. The first line in FIG. 4 shows the corrected time signal T1', while therebelow the step time signal T2 is represented. V2 represents the output impulses of the counter chain ZII and N2 represents the output impulses of the counter chain ZIII. The measuring period clock MG gives off different signals at the output lines 1 through 4 for the execution of the distortion measurement, which signals are derived from the step time signal T2. The last three lines in FIG. 4 show the output signals of the gate GIII and GIV and GV. The giving out of the measured values stored in the counter chains is caused by the measuring period clock. The length of the measuring period can be selected corresponding to the given case of application. The impulse at the output 4 resets the counter stage ZS following the gate GV to the rest position, and thus, prepares the take over of a new measured value. The impulse at output 3 releases the gate GIII and GIV. The impulse at output 2 sets the dynamic memories (storages) for the leading distortion; namely, the counter chain ZII, back with the correct phase position. The impulse at output 1 sets the memory for the lagging distortion; namely, the counter chain ZII, back phase correct. Thereby, the position of the reset pulse impulses is so selected, that no measured value can be lost, i.e., the input of the leading measured value can occur after time point $t_4$, the input of a lagging measured value can occur from time point $t_6$ on. Depending on the position of the switch S (FIG. 2) the output of the distortion value takes place over the gates GIII and GIV. From the beginning of the possible space in time for transfer $t_1$ through $t_6$, the gates GIII and GIV are released by impulses at the output 3 of the measuring period clock. If the switch S is in the position for the measurement of the isochronous total distortion, then the leading and lagging distortion values are successively given out as counter impulses by gate GV, and, indeed, the leading distortion value from $t_3$ through $t_4$, the lagging distortion value from $t_4$ and $t_5$. The counter impulses are counted in the counter stage. The counter value indicated by the counter stage corresponds to the maximal distortion value. In FIG. 4, the counter stage recognizes eight impulses (compare the last line in FIG. 4), so that there results an isochronous total distortion of 8 percent.

Figure 5:
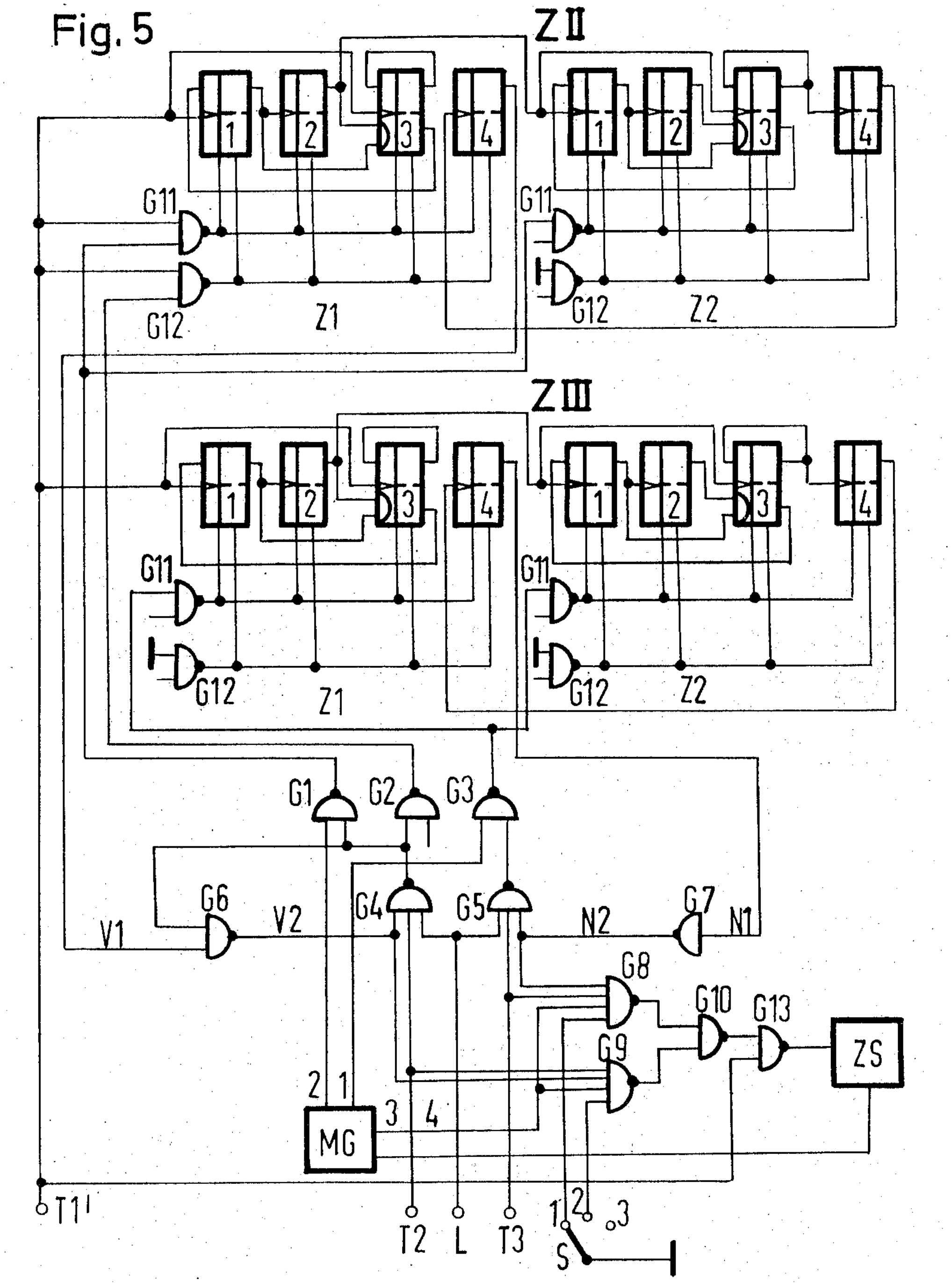
FIG. 5 illustrates another preferred embodiment of the invention using integrated circuit construction.

FIG. 5 shows an especially advantageous circuit arrangement of the dynamic measured value memory, which is executed (developed, constructed) with construction stages usual in the trade in integrated switching circuit technology. FIG. 5 shows counter chain ZII and ZIII, the output gates, the measuring period block and the counter stage for the indication of the distortion values.

Each counter chain consists of two construction stages usual in the trade, which exhibit a decimal counter Z1 or Z2 having 4 bistable trigger stages 1 through 4 and 2 NAND gates 11 and 12. The resetting of a counter to the counter position "zero" takes place over the set back gate G11; the resetting of the counter to the counter position "9" takes place over the set back gate G12 of the construction stage. The counter chain Z1 is not shown in FIG. 5, however, it consists of two construction stages usual in the trade in the same manner. The outputs of the counter chain ZI are represented with the output clips T2 and T3. The measuring impulses arrive from the input circuit over the line L at the counter chains. The corrected time signal arrives from the synchronizing device over the clamp T1' at the counter chains. The gates G4 and G5 are the gates, which are controlled by the measuring impulses and by the resets, V2 and N2 of the counter chain outputs by the step time signal T2 and by the negated step time signal T3. The reset for the counter chain for lagging distortion takes place in the same manner through the measuring impulse and the set back impulse of line 1 from the measuring period clock, which are both mixed at gate G3. At the counter chain for the storing of the leading distortion, the resetting takes place separately through measuring impulses and through the measuring period clock. At the taking over of the measuring value, the output of the counter chain changes the polarity, at the return through the measuring period clock in the middle of the step, the next polarity change should first take place in phase with the step time signal at the beginning of the step. Therefore, the return impulse of the line 2 goes from the measuring period clock over the gate G1 to the reset gate G11 of the decimal counters Z1 and Z2, the measuring impulse goes over the gates G4 and G2 to the return gate (set back gate) G12 of the counter Z1 and also simultaneously over the gate G1 to the return gate (set back gate) G11. With the simultaneous application of signals to the return gates (set back gates) G11 and G12, the return to the counter value "9" over gate G12 takes precedence. To equalize differences in running time of measuring impulses and set back impulses, the time signal T1' which coincides with both set back impulses is simultaneously given to the set back gates G11 and G12 of the counter Z1. Behind (after) the gate G4, the measuring impulse is routed back again to an input of G4 over G6. After the application of the measuring impulse, the memory output V1 changes its polarity and would otherwise still block the gate G4 over the gate G6 during the duration of the set back impulse. The gates G8 and G9 are the transfer gates. They are prepared by the output 3 of the measuring period clock and pass on the measured value in the form of a corresponding impulse length. Depending on which gate is blocked by the switch S, only leading distortion, lagging distortion or the total distortion is measured. Over the mixing gate G10, the impulse gate G13 is open, which gives off a number of counter impulses to the counter stage ZS corresponding to the distortion value.

I claim:

1. Apparatus for measuring the maximum values of distortion of binary signals during an adjustable measuring period, the duration of said binary signals differing from an ideal duration, the appatatus comprising:

timing signal generator means for producing clock pulses, input means for receiving said binary signals and for regenerating said binary signals, synchronizing means coupled to said timing signal generator and said input means for producing corrected clock pulses whereby ones of said corrected clock pulses will coincide with edges of said binary signals, first, second and third counting means controlled by said corrected clock pulses, said first counting means producing output signals at intervals corresponding to said ideal duration, each counting means being adapted to register one count cycle during said ideal duration and having as many counting positions as there are corrected clock pulses within said ideal duration, means for generating measurement pulses, said measurement pulses coinciding with edges of said received binary signals, first gate means for receiving said measurement pulses and for coupling same to reset inputs of said second counting means, second gate means for receiving said measurement pulses and for coupling same to reset inputs of said third counting means, means connecting an output of said first and said second counting means to an input of said first gate means, means connecting an output of said first and said third counting means to an input of said second gate means, whereby upon the occurrence of a leading distorted measurement pulse, there appears over said first gate means a reset signal for said second counting means, and upon the occurrence of a lagging distorted measurement pulse there appears over said second gate means a reset signal for said third counting means, fourth counting means for counting said corrected clock pulses and indicating a corresponding distortion value and fourth gating means having as inputs the outputs of said second and third counting means and said corrected clock pulses, said gating means being operable to connect said corrected clock pulses to said fourth counting means during the time said output signals of said second and third counting means are different.

2. The apparatus defined in claim 1 wherein said fourth gating means comprises fifth, sixth and seventh gating means, and including a measuring period gate generating means for establishing a period in which the maximum distortion shall be measured, wherein an output of said second counting means is applied to an input of said fifth gating means with said fifth gating means receiving as other inputs an output from said measuring period gate generating means and an output from said first counting means, an output from said third counting means is applied to an input of said sixth gating means which has as other inputs an output from said second counting means and an output fron said measuring period gate generator means, the outputs from said fifth and sixth gating means being applied to said seventh gating means which also receives as an input said corrected clock pulses, the output fron said seventh gating means being applied to said fourth counting means to count said distortion value.

3. The apparatus defined in claim 2 wherein said measuring period gate generator means derives said clock pulses fron said first counter means, and wherein said measuring period gate generator means has an output connected to a reset input of said second counting means and an output connected to a reset input of said third counting means, said gate generator outputs being used to bring said second and third counting means in phase with said first counting means after the producing of a distortion value.

4. Apparatus as claimed in claim 3 wherein an output of said measuring period gate generator means is connected to a reset input of said fourth counting means to set it in the zero position before the counting of a distortion value.

* * * * *